United States Patent
Lindegren et al.

(10) Patent No.: US 8,983,502 B2
(45) Date of Patent: Mar. 17, 2015

(54) MEASURES INDICATIVE OF WIRELESS DATA TRANSFER RATES FOR A USER EQUIPMENT

(75) Inventors: David Lindegren, Lulea (SE); Andreas Ekeroth, Lulea (SE); Jorgen Gustafsson, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 13/642,260

(22) PCT Filed: Apr. 22, 2010

(86) PCT No.: PCT/SE2010/050447
§ 371 (c)(1),
(2), (4) Date: Oct. 19, 2012

(87) PCT Pub. No.: WO2011/133078
PCT Pub. Date: Oct. 27, 2011

(65) Prior Publication Data
US 2013/0035115 A1  Feb. 7, 2013

(51) Int. Cl.
*H04W 24/00* (2009.01)
*H04W 28/22* (2009.01)
*H04W 24/10* (2009.01)
(Continued)

(52) U.S. Cl.
CPC .............. *H04W 28/22* (2013.01); *H04W 24/10* (2013.01); *H04W 40/12* (2013.01); *H04W 48/16* (2013.01); *H04W 64/00* (2013.01); *H04W 88/02* (2013.01)
USPC ................. 455/456.3; 455/456.1; 455/575.1

(58) Field of Classification Search
USPC ............... 455/414.1–414.3, 422.1–425, 455/456.1–457
See application file for complete search history.

(56) References Cited

U.S. PATENT DOCUMENTS

| 2005/0107135 A1 | 5/2005 | Deeds et al. |
| 2005/0245275 A1 | 11/2005 | Byford et al. |

(Continued)

FOREIGN PATENT DOCUMENTS

| EP | 1235451 A1 | 8/2002 |
| EP | 1458123 A1 | 9/2004 |

(Continued)

OTHER PUBLICATIONS

Office Action issued on Oct. 8, 2013 in corresponding Japanese application No. 2013-506108 (Notice of Reasons for Rejection only), 2 pages.

(Continued)

*Primary Examiner* — Kashif Siddiqui
(74) *Attorney, Agent, or Firm* — Rothwell, Figg, Ernst & Manbeck P.C.

(57) ABSTRACT

A user equipment (26) for wireless communication with a mobile base station (18). The user equipment is configured to: obtain a current location (P4) of the user equipment; receive a set of quality measures indicative of wireless data transfer rates in an area (A) comprising the current location (P4); present on a graphical interface (218) of the user equipment i) a new location (P5) comprised in the area (A), or ii) a direction (D5) to the new location (P5) comprised in the area (A). The new location (P5) is, in comparison with the current location (P4), associated with a relatively higher quality measure indicative of a wireless data transfer rate. A network node for obtaining and providing the set of quality measures is also disclosed, as well as related methods and computer readable mediums.

29 Claims, 5 Drawing Sheets

(51) Int. Cl.
*H04W 40/12* (2009.01)
*H04W 48/16* (2009.01)
*H04W 64/00* (2009.01)
*H04W 88/02* (2009.01)

(56) References Cited

U.S. PATENT DOCUMENTS

| | | |
|---|---|---|
| 2007/0010259 A1* | 1/2007 | Hoffmann ............... 455/456.1 |
| 2008/0153470 A1 | 6/2008 | Ohsako et al. |
| 2010/0054185 A1 | 3/2010 | Kaneko et al. |
| 2010/0317338 A1 | 12/2010 | Ohsawa |

FOREIGN PATENT DOCUMENTS

| | | |
|---|---|---|
| JP | 2003249887 A | 9/2003 |
| JP | 2008288777 A | 11/2008 |

OTHER PUBLICATIONS

Japanese Final Office Action issued May 13, 2014, JP Patent Application No. 2013-506108 and English translation of Office Action, 4 pages.

* cited by examiner

MEASURES INDICATIVE OF WIRELESS DATA TRANSFER RATES FOR A USER EQUIPMENT

CROSS-REFERENCE TO RELATED APPLICATION

This application is a 35 U.S.C. §371 National Phase Entry Application from PCT/SE2010/050447, filed Apr. 22, 2010, and designating the United States.

TECHNICAL FIELD

The invention relates to a user equipment for wireless communication which can receive a set of quality measures indicative of wireless data transfer rates in an area comprising a current location. The invention also relates to an associated network node.

BACKGROUND

WiFi and 3G throughput data (data transfer rates) can presently be determined for mobile user equipments by employing certain software such as the application "Bredbandskollen" for the iPhone. This application uses an available radio interface to download and upload data from a server, and results can be sorted by "my results" or "results by other users close to me". Throughput in bits is used as a performance metric.

Further prior art exist for determining and presenting wireless data transfer rates, such as US20050107135 A1, which discloses a user terminal (user equipment) adapted to communicate via a communications system with a detectable available bandwidth (rate of data transfer). The user terminal includes a transmitter and a receiver for transmitting and receiving a plurality of different communications signals, respectively. Also, the terminal includes a display capable of visually representing the available bandwidth of a current communications system. Additionally, the display is adapted to visually represent the bandwidth that is required to transmit and receive signals on a current communications system. To control the operation of the display, the terminal includes a controller that determines the available bandwidth of the current communications system, and alters the appearance of the display based on the determination of available bandwidth.

Even though exemplified and other existing techniques can provide information related a data transfer rate for a mobile user equipment, it is appreciated that improvements are required for making such techniques more applicable and user friendly.

SUMMARY

It is an object of the invention to at least partly overcome one or more of the above-identified limitations of the prior art. In particular, it is an object to provide a user equipment that offers an alternative, user friendly way of presenting a data transfer rate.

Hence a user equipment is provided, which is adapted for wireless communication with a mobile base station and is configured to: obtain a current location of the user equipment; receive a set of quality measures indicative of wireless data transfer rates in an area comprising the current location; present on a graphical interface of the user equipment; i) a new location comprised in the area, or ii) a direction to the new location comprised in the area. The new location is, in comparison with the current location, associated with a relatively higher quality measure indicative of a wireless data transfer rate.

The user equipment is typically a mobile phone, laptop, tablet computer, netbook, e-book reader, media center, media player, 3G dongle in combination with e.g. a laptop, or any other electronic device that can communicate wirelessly with a mobile base station. The mobile base station can in turn be an 802.xx-type access point or a mobile or cellular access point such as a conventional 3G base station or eNodeB of an LTE (Long Term Evolution) network. Thus, the user equipment and base station can form a wireless network such as an IEEE 802.11 network which includes Wi-Fi or WLAN networks, or a long range telecommunications network such as a GPRS-equipped GSM network or a W-CDMA (Wideband Code Division Multiple Access) based network, or an LTE cellular network implemented accordance with the 3GPP (Third Generation Partnership Project) Release 8 specifications.

Obtaining the current location can include, for example, retrieving a current location by means of e.g. a GPS (Global Positioning System) module included in the user equipment, or can include receiving the current location from the base station, e.g. by using triangulation based techniques for determining the current location.

The set of quality measures indicative of wireless data transfer rates can be, for example, a measure of available or consumed data communication resources, expressed as e.g. bandwidth, channel capacity, throughput, goodput, bit rate, average bitrate after multimedia data compression etc. The set of quality measures can also be a measure that predicts a users perceived quality of a service delivered via the user equipment, such as a mean opinion score (MOS) that provides a numerical indication of the perceived quality of received media.

The new location can be determined either by the user equipment itself or by a network node that communicates the new location to the user equipment. In any case, the determination typically includes comparing a quality measure (indicative of a wireless data transfer rate) of the current location with corresponding quality measures at locations adjacent or close to the current location. The new location is then set to an adjacent or close location that has a better quality measure than the current location, and a direction to the new location and/or the new location per se is then presented in the user equipment.

The user equipment provides an alternative way of presenting a data transfer rate. A particular effect of the user equipment is that, when employed in combination with several similar user equipments, users can be directed away from areas covered by a base station that experience a heavy load, which solves the problem of achieving a more efficient distribution of a load on the network the user equipments are a part of.

The set of quality measures may be associated with a certain time, such that the set of quality measures is time dependent. This basically means that the quality measures can be expressed as a function of time, i.e. different quality measures can be given at different times of the day, week or year.

The set of quality measures may be associated with a mobile base station the user equipment currently is communicating with, such that the set of quality measures is base station dependent. From this follows that the quality measures can be expressed as a function of (i.e. can be based on) which base station the user equipment currently is communicating with.

The set of quality measures may be associated with performance metrics in a communication network that delivers a service to the user equipment, such that the set of quality measures is network dependent. From this follows that the quality measures can be expressed as a function of the network the user equipment currently is communicating with or is part of. The quality measure can in this case be determined by using available performance monitoring tools that measure network performance.

This can help in identifying bad quality that stems from bad nodes in the network, which nodes often are service specific (e.g. streaming video might be affected by a certain node while voice calls are unaffected). Also, by combining user equipment client data (in form of e.g. decoded frame loss, audio/video sync, consumed data communication resources or a MOS) with network statistics that span over a long time useful information can be provided which that can be used for predictions of how the network is currently behaving and how it may behave in the future.

The set of quality measures may be associated with an application residing in the user equipment, such that the set of quality measures is application dependent. From this follows that the quality measures can expressed as a function of which application in the user equipment that requires data to be transferred over the network. In this context, "an application" can be different programs, such as a web browser, an e-mail program or a media streamer such as Skype.

The set of quality measures may be associated with a service provided to the user equipment, such that the set of quality measures is service dependent. The service can, for example, be one of different internet services using a common web browser application that is executed on the user equipment. Examples of services include, for example, social-network services, web-page search services, video services (i.e. video data streamed to the UE), audio services or another type of service that requires transmission of certain data. Such services are provided by e.g. Facebook, Google, YouTube any many other vendors.

The area may comprise a set of sub-areas, and each sub-area may be associated with a respective quality measure of the set of quality measures. A sub-area can be defined as e.g. a coordinate, and can in a further embodiment include one or mores distances from the coordinate, for defining an extent of the sub-area. When a sub-area covers a certain surface, each subarea may have a respective size of 1 $m^2$-250 $m^2$. The new location is typically included in one of the sub-areas while the current is included in another sub-area.

The user equipment may be configured to provide a warning message if the user equipment approaches a location associated with a relatively lower quality measure indicative of the wireless data transfer. The relatively lower quality measure can be determined by comparing its measure with a threshold value that forms a lower limit for acceptable quality of the data transfer. Optionally or alternatively, the warning message may be given if an area with a lower quality measure than the quality measure for the current location is approached. The warning measure can, for example, be an audio signal from the user equipment or a graphical warning or indication on the graphical interface.

According to another aspect, a network node for a wireless communication network is provided. When installed in the wireless communication network, the network node is configured to: obtain sets of quality measures for a number of wireless user equipments communicating with a mobile base station of the wireless communication network, the sets of quality measures indicative of wireless data transfer rates at a respective current location of the wireless user equipment and in a common area; and provide to a certain user equipment in the common area a set of certain quality measures. The set of certain quality measures is i) derived from the obtained sets of quality measures, and ii) indicative of wireless data transfer rates at the current location of the certain user equipment.

The network node can be e.g. a computer server in the wireless communication network and can regularly obtain sets of quality measures by continuously receiving from various user equipments quality measures indicative of wireless data transfer as experienced by the respective user equipment. When receiving these sets of measures, they are associated with a respective current location and thus the network node can create a database over locations and their respective quality measure. The sets of measures can, as will be described in detail below, be aggregated and stored in a number of different ways. Upon request from a user equipment, or when a certain application is executed, the network nodes provides or sends to a certain user equipment a set of certain quality measures. This certain set is derived (or selected) from the obtained sets on basis of a current location of the certain user equipment, such that the quality measure of the selected set corresponds to the measures obtained (possibly aggregated) for the same location. If no measure for the current locations is previously received, the certain set can be determined to be the set corresponding to a location closest to the current location.

Thus, the set of certain quality measures may be associated with previous locations of the number of wireless user equipments for which the sets of quality measures was obtained, and the previous locations may correspond to the current location of the certain user equipment. The correspondence between the previous locations and the current locations can mean that previous locations represent locations (or an aggregation of locations) that are closest to the current location.

The network node may be configured to measure network performance and include the measured network performance in the sets of quality measures.

Also, as described above in connection with the user equipment, the sets of obtained quality measures may be associated with a certain time, and may be associated with the mobile base station the user equipments communicated with when the measures were obtained. In this case, when the network node collects obtain sets of quality measures, the quality measures is stored as time dependant and cell dependant. Moreover, when the network node provide to the certain user equipment a set of certain quality measures, the set of quality measure is selected on basis of the current time and date and/or which cell the certain user equipment is part of.

The obtained sets of quality measures may additionally be associated with performance metrics in a communication network that delivers a service to the user equipments for which the sets of quality measures were obtained. Further, the sets of quality measures may be associated with applications residing in the user equipments for which the sets of quality measures were obtained, and the sets of quality measures may be associated with a service provided to the user equipments for which the sets of quality measures were obtained. In this case, when the network node collects obtain sets of quality measures, the quality measures is stored as network, application and/or service dependant. Also, when the network node provide to the certain user equipment a set of certain quality measures, the set of quality measure is selected on basis of which network, application and/or service the certain user equipment is part of, executes or uses.

For the network node the area may comprise a set of sub-areas that correspond to the above described sub-areas. Moreover, the network node is typically configured to provide a set of quality measures to the previously described user equipment.

According to another aspect a method is provided, which is to be performed by a user equipment adapted for wireless communication with a mobile base station. The method comprises the steps of: obtaining a current location of the user equipment; receiving a set of quality measures indicative of wireless data transfer rates in an area comprising the current location; presenting on a graphical interface of the user equipment i) a new location comprised in the area, or ii) a direction to the new location comprised in the area, wherein the new location is, in comparison with the current location, associated with a relatively higher quality measure indicative of a wireless data transfer rate.

According to still another aspect a computer-readable medium is provided, which stores processing instructions that, when executed by a user equipment, performs the above method.

According to yet another aspect a method is provided, which is to be performed by a network node adapted to be installed in a wireless communication network, the method comprising the steps of: obtaining sets of quality measures for a number of wireless user equipments communicating with a mobile base station of the wireless communication network, the sets of quality measures indicative of wireless data transfer rates at a respective current location of the wireless user equipment and in a common area; and providing to a certain user equipment in the common area a set of certain quality measures. The set of certain quality measures is i) derived from the obtained sets of quality measures, and ii) indicative of wireless data transfer rates at the current location of the certain user equipment.

According to a further aspect a computer-readable medium is provided, which stores processing instructions that, when executed by a network node, performs the above method for the network node.

The methods may include any of the functionality implemented by the features described above in association with the user equipment respectively the network node, and share the corresponding advantages.

Still other objectives, features, aspects and advantages of the invention will appear from the following detailed description, from the attached claims as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
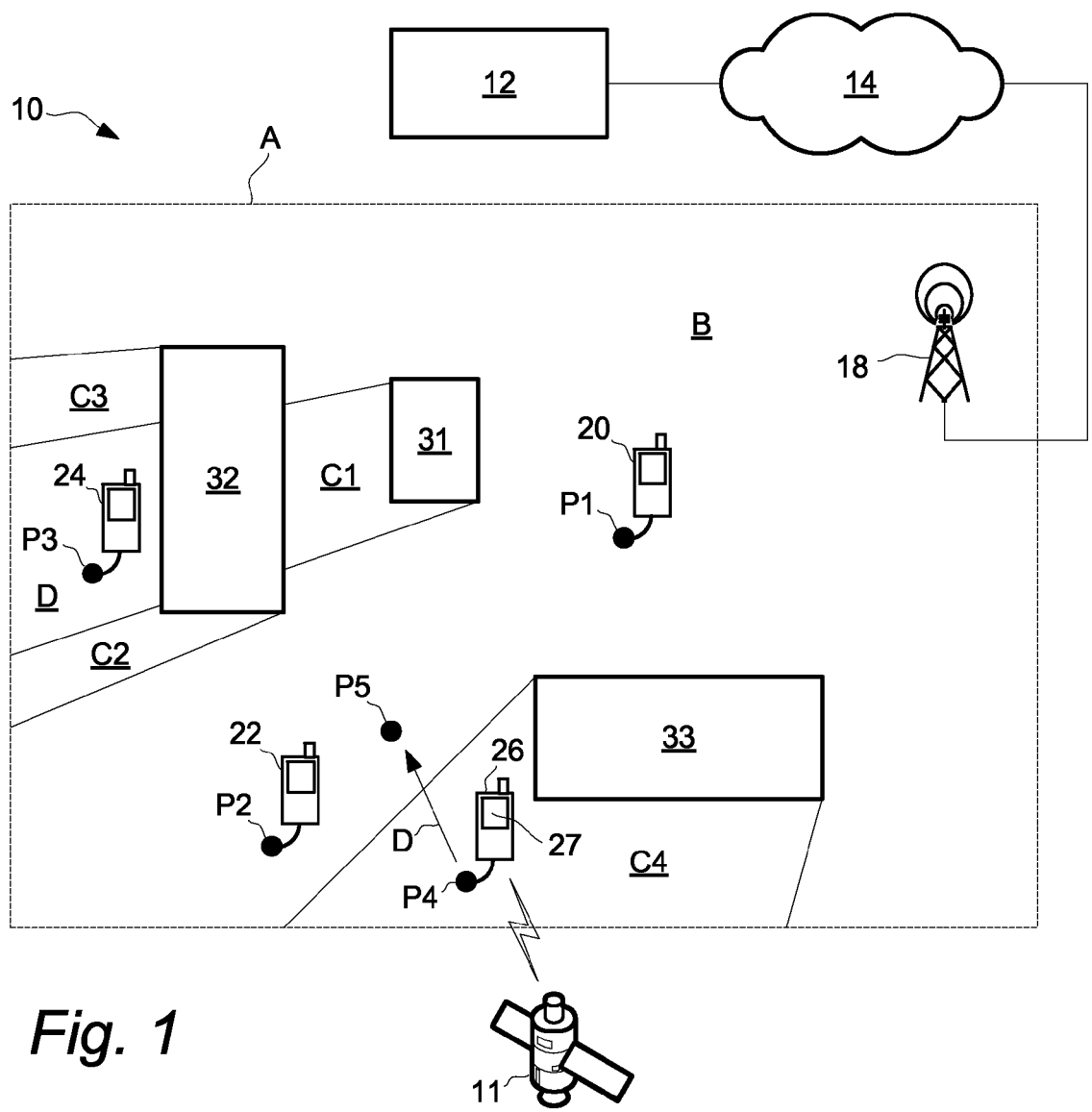
FIG. 1 illustrates a communication network that includes users equipments and a network node that can be used for determining new locations with higher quality measures indicative of wireless data transfer rates.

With reference to FIG. 1 a system 10 for wireless communication is illustrated. The system 10 comprises a network node 12 which via a network 14 is connected to mobile base stations that support wireless communication with a number of user equipments (UEs).

In the exemplified embodiment, one base station 18 and four UEs 20, 22, 24, 26 are shown. The base station 18 can, in a manner known within the art, via the network 14 establish communication between the UEs 20, 22, 24, 26 and the network node 12.

The UEs 20, 22, 24, 26 are located within an area A, where the first user equipment (UE) 20 is located at position P1, the second UE 22 is located at position P2, the third UE 24 is located at position P3 and the fourth UE 26 is located at position P4. The area A is divided into subareas where a first sub-area B comprises locations at which a UE experience good conditions for signal (data) transmission with the base station 18, e.g. due to a clear line of sight to the base station 18. Any UE located within sub-area B typically experiences good signal conditions when communicating with the base station 18.

The area A also includes sub-areas C1-C4 and D that comprises locations at which a UE experience poor signal conditions during communication with the base station 18, e.g. due to three building 31, 32, 33 within the area A. Any UE located within the sub-areas C1-C4 and D typically experiences poor signal conditions (at various degrees at the various sub-areas) during communication with the base station 18.

Since the different sub-areas, B, C1-C4, D provide different conditions for signal transmission between a UE and the base station 18, data transfer rates for wireless communication are different for the sub-areas. If quality measures that reflect data transfer rates at the sub-areas B, C1-C4, D are determined, each sub-area would then have, i.e. be associated with, different quality measures indicative of wireless data transfer rates. Of course, other parameters than presence of buildings can cause different quality measures for different sub-areas.

The network 14 is implemented as, or include, for example a WAN (Wide Area Network), a LAN (Local Area Network), the Public Switched Telephone Network, the Internet, and one or more intranets. The network 14 can also include a wireless short or long range network such as a local wireless network built using one of the IEEE 802 wireless communication protocols, Wi-Fi Protected Access, or a long range wireless network like a cellular, and or satellite-based wireless network, and support voice, audio, video, text, and/or any combination thereof, e.g., a GSM (Global System for Mobile communications), TDMA (Time Division Multiple Access), CDMA (Code Division Multiple Access), W-CDMA, and/or a network like the LTE network as specified by 3rd Generation Partnership Project (3GPP) Release 8.

The base station 18 is configured to support communication with the network 14, whether short or long range, and can thus be implemented as an 802.xx-type access point or as a cellular access point such as a conventional 3G base station or eNodeB of an LTE network. The base station 18 is implemented for communication with the network 14 and according to known standards.

Figure 2:
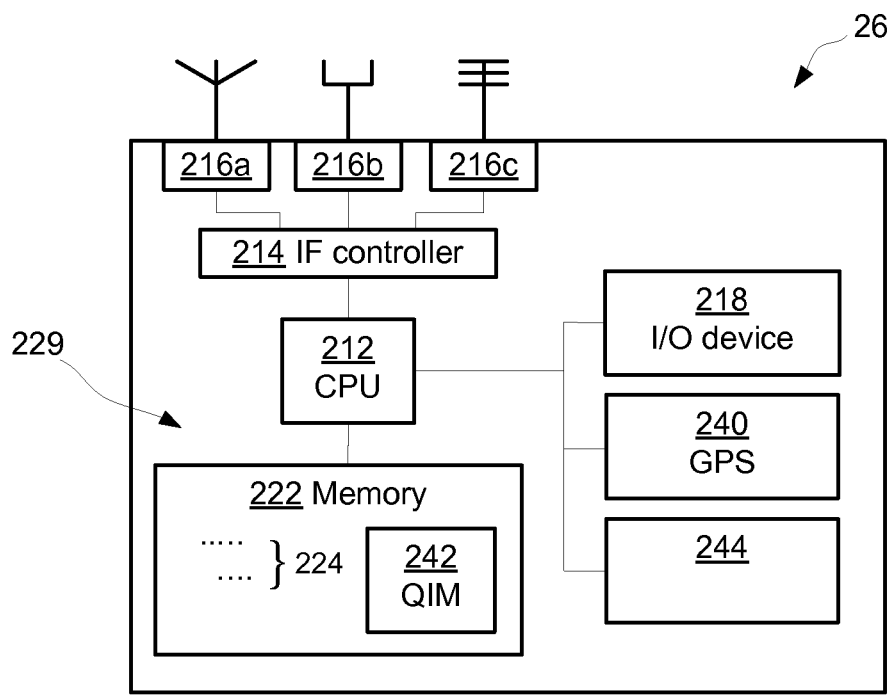
FIG. 2 illustrates a user equipment used in the communication network of FIG. 1.

With reference to FIG. 2, an embodiment of the UEs 20, 22, 24, 26 is illustrated in further detail and is indicated by reference numeral 26. The UE 26 comprises a processor 212 in the form of a central processing unit (CPU) that is connected to a communication interface controller (IF controller) 214 which in turn controls communication interfaces like a GSM, UMTS (Universal Mobile Telecommunications System) or LTE interface 216a, an interface 216b implementing one of the IEEE 802 wireless communication protocols, such as 802.11n or 802.16, and any other suitable communications interface 216c configured for wireless communication, either direct with other UEs or with UEs via a type of base station.

A computer readable medium (Memory) 222 in the form of e.g. a flash memory, a hard disk or an EEPROM (Electronically Erasable Programmable Read-only Memory) is connected to the processing unit 212, and a computer program 224 having software instructions implementing one or more software applications are stored on the memory unit 222. Here one of these software applications is an application that implements functionality for presenting a new location with better conditions for data transmission (i.e. higher quality measure) or a direction to the new location. On the memory unit 222 is program code stored for applications and services to be executed by the UE 26. Examples of applications include various web browsers, e-mail clients, media applications like Skype, downloaded applets etc. The processor unit 212 can detect which applications is currently executed as well as can detect a service that is executed by a certain applications. Examples of services include e.g. Twitter, Facebook, YouTube and other kinds of social network and/or media services that are executable via, for example, a web browser application.

In combination, the memory unit 222 and the computer program 224 form a computer program product 229. In other embodiments the computer program product could be a disc, a hard drive, CD or DVD on which the computer program 224 is stored. Incorporated in the UE 110 is also a graphical interface (I/O device) 218 that comprises a display or touch screen that allows information to be viewed on the UE 26. A GPS module 240 that can determine a location of the UE 26 is connected to the processor 212 by receiving a signal from a GPS satellite 11. Also, the memory unit 222 comprises a quality indicator module (QIM) 242 that can perform relevant methods described below which includes determining quality measures indicative of wireless data transfer rates at a current location of the UE 26. The determined quality measures can be communicated from the UE 26 to the network node 12. Also, the quality indicator module 242 can receive quality measures from the network node 12. Generally, the quality indicator module 242 is implemented as software instructions which are stored on the memory unit 222 and executed by the processor 212. Instead of the GPS module 240, other embodiments of the UE 26 could comprise other circuits/receivers for satellite-based positioning systems like GLONASS. It is also foreseeable that in the future, once the systems are up and running, circuits/receivers compliant with Galileo or the Compass system, also known as Beidou-2, can be used instead of or in addition to the GPS module 240.

Figure 3:
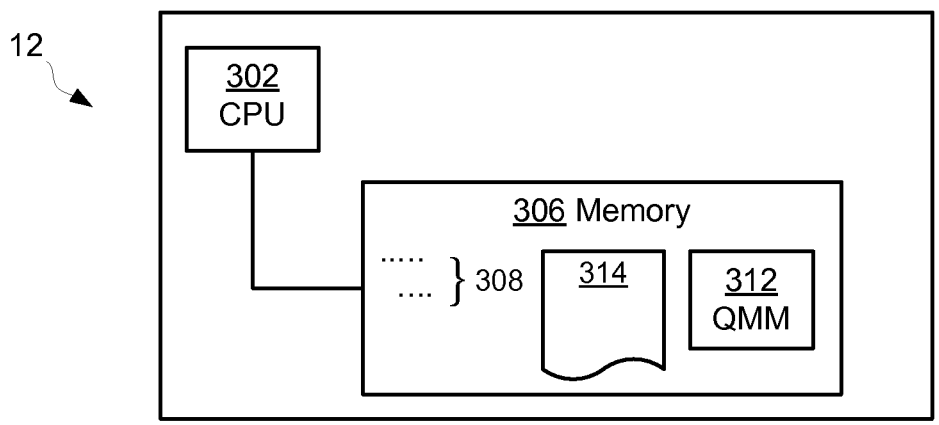
FIG. 3 illustrates a network node used in the communication network of FIG. 1.

With reference to FIG. 3 an embodiment of the network node 12 is illustrated in further detail and comprises a processor 302 in the form of a central processing unit (CPU) to which a memory unit 306 similar to that of the UE 26 is connected. A computer program 308 is stored on the memory unit 306 and comprises software instructions that implement functionality for obtaining sets of quality measures from the UEs 20, 22, 24, 26 that communicate with the base station 18. The network node 12 can be implemented in form of a computer that can communicate with the UEs 20, 22, 24, 26 via the network 14 and the base station 18. From this follows that both the network node 12 and the UEs 20, 22, 24, 26 are configured to fulfill one or more standards and protocols employed by the network 14.

More specifically, the memory unit 306 comprises a quality management module (QMM) 312 that includes functionality for obtaining sets of quality measures from the UEs 20, 22, 24, 26. The quality management module 312 per se can be implemented as software code that is stored on the memory 306 and executed by the processor 302. The quality management module 312 receives sets of quality measures from the UEs 20, 22, 24, 26 and can communicate a certain quality measure to the UEs, for example upon a request from the quality indicator module 242 in a UE 26, and implements the relevant functionality described below.

During operation and in general terms, the UE 26 can via its interface provide information of the service quality (i.e. the quality measure) for the surrounding area which may enhance the experience of a service in different ways and may eventually demand less load on the network 14 and the UE 26 itself. Information gathered by the UE 26 itself, network data and statistics and/or a map provided by an operator or service provider can be used and assessed by the UE 26. The sets of quality measures can contain information of how the quality has been earlier in that area (exemplified by e.g. area A and its sub-areas) logged by the network node 12 from measurements made by every, or a subset of, UEs 20, 22, 24, 26 in that area A. Information can be displayed using different technologies by combining the network/UE measurements with parametric/bitstream quality models that can give a measure of the quality for a specific service. Using both UE and network node measurements can provide a realistic description of the service quality in the concerned area A. The user can use this information to enhance the service quality by moving to a better location suggested by the UE, either indirect by giving a map of good/bad locations or direct by choosing a direction for the user to go for gaining quality. The UE is also configured to warn if the user is heading into a known bad area.

An application in the UE can receive information from the network node 12 of how the network quality is in certain areas. Location of the UE and of the other previous/current UEs that report service quality can be gathered by the network node 12 from the base station 18 or cell information (distance to base station/cell) or reported from UEs (GPS coordinates, distance to cell). Base station coordinates and other network information are also stored in the network node 12. This information can be used to calculate service quality which can then be visualized. For example, the information can be displayed as a map with area markers (green, red etc.) that show green for good quality measures and red for bad or with a higher resolution in different colors for different mean opinion scores (MOS) or levels of latency.

Alternatively, the information can be displayed as "enhanced reality" by an overlay of filmed surroundings with areas colored in different colors, spots with numbers etc. For this purpose the UE 26 comprises a video enabled camera 244 that is combined with the GPS 240 or equivalent positioning device with a direction indicator. To calculate the boundaries for the colors, predicted throughput, quality MOS, etc. can be used. Also the device may display an arrow or another type of pointer as a suggestion in which direction to go for obtaining a better quality measure than at a current location.

The UE 26 can also provide information about bad areas related with poor quality measures, such as, during a speech call, giving a warning beep when the UE 26 is approaching an area with known speech quality problems. The user can also get a different warning beep when the UE 26 is approaching an area where there is an increased risk of dropped calls. Also, an audio signal such as a beep can be heard when the user is watching a video on the UE 26, i.e. when it is not possible/desirable to display anything else than the video on the interface, if the user is approaching a bad video quality area. The UE 26 can provide a more advanced audio signal (synthesized/sampled speech with directions, north/south or left/right/ahead) for the above mentioned cases as an alternative to providing a beep. This includes recorded locations taken from a map-location service (e.g. in the form of "good quality at the store to your right").

Possible quality metrics to show is service quality in MOS-LQO, bitrate, latency etc., or simply "good" or "bad" areas for user convenience based on previously mentioned metrics. MOS-LQO is a type of mean opinion score; see ITU-T (Telecommunication Standardization Sector) Recommendation P.862.1. Predicted MOS may be calculated by using for example a parametric model or a bitstream model, both non-intrusive but rather accurate of end-user quality prediction. The area metric/quality can be created by for example historical measurements in that area, either displaying the overall mean or the "usual value for this time of day" or even a combination of those with "the current status". Using network data can be almost instantaneously, getting data only a couple of minutes old gives good enough results so that the area map is correct.

Information gathered from the network node and UE may give high resolution data both in time (network logging) and space (GPS positioning in UE or coordinates of cells from network data etc). This data can also be used to predict what the quality will be in the current area or neighboring areas in the future.

The suggestion to move to a new location could be given during a service when the quality drops below an acceptable threshold value for a certain period of time, or when the user requests a new location. The quality threshold could be aligned with network counters or set by the user and the triggering of the suggestions should only appear when the user has been in a bad area for a certain time, such as 10-600 seconds. The suggestion to move could also be given if there is a strong correlation between really bad quality for that specific service and a certain closely upcoming day and area, so one can avoid dropped calls for example by not moving into an area with known communication problems. Movement prediction can be used to see where the user is heading. The suggestions of where to move may for obtaining better communication conditions be implemented such that they have a limitation in respect of how far a user may travel.

In one embodiment the network node 12 and a number of other, similar network nodes are used as much as possible to let the network node 12 determine the suggestions and calculate all quality scores (e.g. for UEs in form of older cell phones). Another option includes letting the UE 26 calculate as much as possible by using data it knows (number of lost packets etc) and combine this with the network metrics and data that other UEs provided to network node 12.

Figure 4:
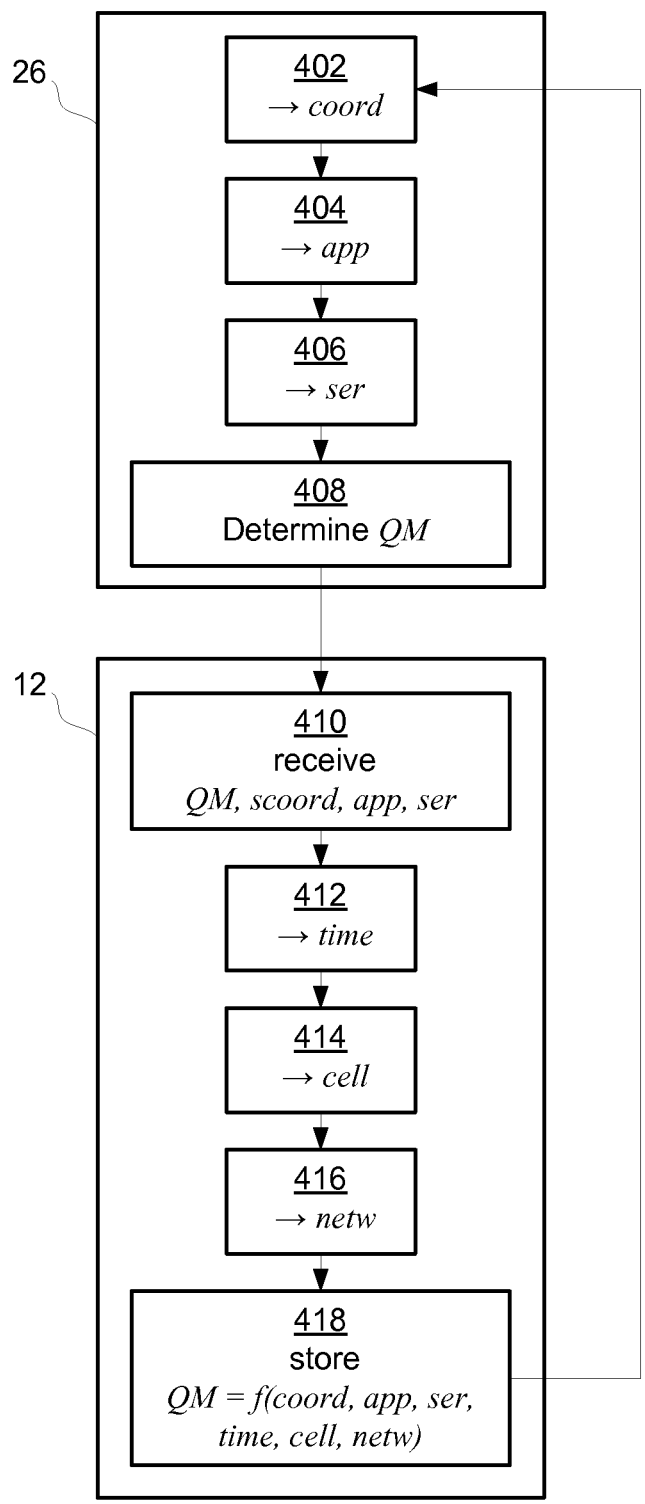
FIG. 4 is a flow chart of a method for collecting quality measures indicative of wireless data transfer rates in different areas.

In further detail and with reference to FIG. 4, the functionality related to the quality measure described and exemplified above for the UE 26 and network node 12 is illustrated, and is typically performed by the combination of the quality indicator module 242 of the UE 26 and the quality management module 312 of the network node 12.

In a first step 402 the UE 26 obtains a current location P4. The global positioning module 240 assists in this by providing the current coordinates coord. As an option to using the global positioning module 240 or a similar alternative, the current location coord may be obtained by using triangulation based techniques, such as the Ericsson MPS (Mobile Positioning System) product.

In a next step 404 the UE 26 obtains information about which application app is currently being executed on the UE 26 and that is requiring data transmission between the UE 26 and the base station 18. This can be done by conventional task manager-functionality implemented in the UE 26. Typically app is represented as a string or an integer that uniquely may identify a specific application, such as various web-browsers, media streamers, e-mail clients etc.

In a next step 406 the UE 26 obtains information about which service serv is currently being used by the UE 26 and is requiring data transmission between the UE 26 and the base station 18. Typically, also serv is represented as a string or an integer that uniquely identifies a specific service, such as Google, YouTube, general video-streaming, audio etc. Obtaining information about the service such that it can be identified can be done by e.g. determining on which port a relevant media stream arrives on, since different media (type of data) often arrives on different ports. Also, services can be identified by investigating source IP address, URL (Uniform Resource Locator) etc, since most known services are related to specific addresses. Identifying e.g. source IP and URL can be done by suitable known techniques.

In a next step 408 the UE 26 determines a quality measure QM by measuring a suitable value indicative of current wireless data transfer rates for the UE 26. QM is, for example, a measure of available or consumed data communication resources, expressed as e.g. bandwidth, a channel capacity, throughput, goodput, bit rate or average bitrate after multimedia data compression etc. QM can also be a measure that predicts a users perceived quality of a service delivered via the UE, such as a mean opinion score (MOS). Suitable method for this process are used, such as functionality for determining packet-loss, re-buffering, encoded bitrate etc. QM is preferably performed for the relevant application and service and always for the current location, such as P1-P4 for the UEs of FIG. 1.

Examples of methods for determining QM includes using e.g. MBMS (Multimedia Broadcast and Multicast Services) for reporting for the case of multicast video, which is described in 3GPP recommendation 26.346. Information about how the metrics can be written in the SDP (Session Description Protocol) and how often the reports can be sent can be found in the same recommendation. Also, the media bitstream could be parsed/decoded and used as input to a suitable quality measure model for determining QM.

Optionally, depending the subsequent requirements, QM may be normalized by e.g. dividing the determined QM with a maximum quality measure $QM_{max}$ such that a relative value for $QM_{norm}$ is obtained, ranging from 0-100% where 0% represents no signal transmission while 100% represents best possible signal transmission. Suitable values of $QM_{max}$ can be determined based on practical and/or theoretic knowledge about the network and the type of UE, and is commonly available for the various types of equipment described herein.

In a next step 410 the network unit 12 receives the variables coord, app, ser and QM and alternatively $Q_{norm}$ from the UE 26, which uses its communication interfaces for transmitting the variables to the network unit 12, via the base station 18 and network 14.

In a next step 412 the network unit 12 determines the current time time which is estimated to the time when the variables coord, app, ser, QM and possibly also $Q_{norm}$ were received. Optionally or alternatively, the UE 26 determines time by setting it to the time when the QM was determined and transmits time to the network node 12 together with the transmission of i.a. QM. For purpose of determining time the respective processor unit 212, 302 of the UE 26 and the network node 12 is capable of determining and retrieving a current time.

In a next step 414 the network unit 12 determines which cell cell, i.e. which base station 18, is involved in the communication with the UE 26. This can be done by retrieving a current cell-ID and access cell-ID information (location), for example by using a Java ME application in e.g. SonyEricsson® from JP-7 and forward, or the Nokia® S60 platform and UIQ.

Optionally or alternatively, in accordance with 3GPP recommendation 36805-900 radio environment measurements QM such as the specified CPICH RSCP, CPICH Ec/No, or TDD P-CCPCH RSCP and ISCP, RSRP and RSRQ (connected mode only) can be logged periodically by the network node 12 as a measure of the radio quality. The base station 18 can also retrieve and provide to the network node 12 information about how much power headroom it has on total data bandwidth used for communication with the UE 26 and how many more users it can provide with coverage, and use this as a radio environment measurements. These radio environment measurements $QM_{cell}$ can be normalized in a manner corresponding to the normalization that gave $QM_{norm}$, by using a maximum quality measure $Q_{cell,max}$ possibly obtainable for the current cell, which results in a normalized value $QM_{cell,norm}$ between 0-100%. Suitable values of $QM_{cell,max}$ can be determined based on practical and/or theoretic knowledge about the cell (base station), and is commonly available in connection with the various types of base stations described herein.

In a next step 416 the network unit 12 determines which network netw is used for providing the service/data transmission to the UE 26. This is done by tracking involved nodes, which typically includes a server that provides the service and all communication nodes involved for conveying the service to the UE 26. For different services provided to UEs at different locations different nodes are generally involved, and by storing the pattern of involved nodes the network netw can be identified. Also, in this step a network dependent quality measure $QM_{netw}$ can be determined, for example by using the Perf Mon tool developed by Ericsson and which is currently downloadable from the Internet. Perf Mon can take numerous inputs from different parts of the network and synchronizes these by using common IP-numbers, IMEI/IMSI (International Mobile Equipment Identity/International Mobile Subscriber Identity) numbers from UEs etc. The network dependent quality measure $QM_{netw}$ can be normalized in a manner corresponding to the normalization that gave $QN_{norm}$, by using a maximum quality measure $QM_{netw,max}$ possibly obtainable for the current network, which results in a normalized value $QM_{netw,norm}$ between 0-100%. Suitable values of $QM_{netw,max}$ can be determined based on practical and/or theoretic knowledge about the network, and is commonly available in connection with the various types of networks described herein.

In a final step 418 the network unit 12 stores the quality measure QM (and/or $QM_{norm}$) together with at least coord, and optionally stored with expressions for app, ser, time, cell and netw. This means that QM can be expressed as $$QM=f1(\text{coord}) \quad (1)$$

or $$QM=f2(\text{coord,app,ser,time,cell,netw}) \quad (2)$$

To take the radio environment and network into account as in expression (2) an aggregated quality measure $QM_{agg}$ may be determined, e.g. by using the following expression:

$$QM_{agg}=QM_{norm}*QM_{cell,norm}*QM_{netw,norm} \quad (3)$$

The steps described in connection with FIG. 4 is continuously performed by a large number of UEs communicating via a number of base stations, which results in a database of quality measures (item 314 of FIG. 3) is created for a large number of locations. Thus, the database of quality measures 314 comprises sets of quality measures that are dependant on at least the location, as in expression (1), and optionally dependant on further parameters, as in expression (2). To avoid to extensive amounts of data, quality measures may be determined for larger areas instead of only small coordinates. This can be done by collecting proximate coordinates with same or similar quality measures, such that sub-areas like the sub-areas B, C1-C4 in FIG. 1 are generated. For automating this process known data processing techniques may be used and appropriate threshold values can be applied for obtaining suitable boundaries between the sub-areas.

Figure 5:
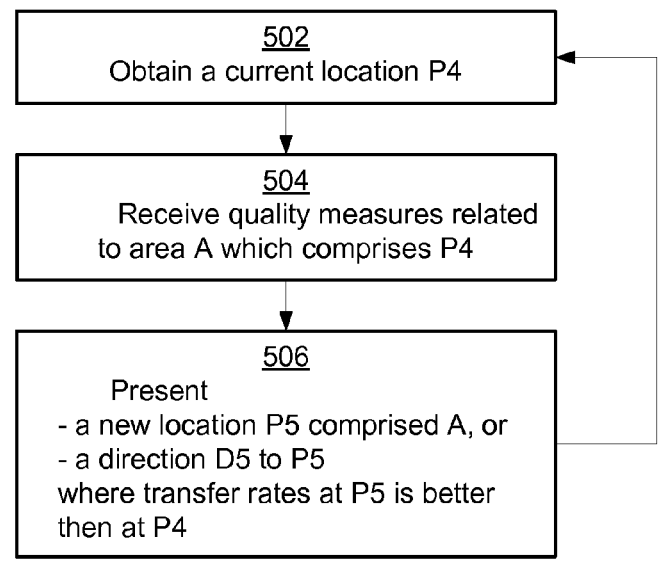
FIG. 5 is a flow chart of a method performed by the user equipment of FIG. 2.

With reference to FIG. 5 a method performed by a UE such as the UE 26 is illustrated, and shows how a new location P5 can be found, which in comparison with the current location P4 is associated with a relatively higher quality measure.

In a first step 502 the current location P4 is obtained, and in a next step 504 the UE 26 receives a set of quality measures from the network node 12. The set of quality measures is indicative of wireless data transfer rates in the area A comprising the current location P4. Specifically, the obtained set can be selected such that the quality measures for the areas surrounding the UE 26 is included. For example, turning to FIG. 1, the UE 26 can receive data describing the sub-area C4 and a quality measure valid for that sub-area C4, and can receive data describing the sub-area B and a quality measure valid for that sub-area B.

In a next step 506 the UE 26 determines if a certain sub-area B has a better quality measure than the sub-area C4 where the UE 26 is currently located, i.e. if increased data transfer rates can be obtained elsewhere at a new location P5. If this is the case the UE 26 presents the new location P5, for example by using an map, or presents a direction D towards the new location P5 such that a user can select an appropriate travelling path. The selection of the new location P5 can employ optimization algorithms implemented in the UE 26 and which that minimize a travelling distance required for reaching the new location P5 with the better communication conditions. The new location or the direction may be presented on the UE 26 by implementing and using conventional techniques for graphical user interfaces.

Optionally, the UE 26 does not determine the new location but merely presents a map with an indication of the current location together with information about areas with different quality measures adjacent/proximate the current location, such that a user is able to navigate to an area that fits his requirements of wireless data transmission. The aforementioned new location is however still comprised in one of the proximate areas that indicates a quality measures, since each of these areas per definition indicates a potential new location.

The steps 502-506 are continuously performed as long as the user is employing the functionality for finding or viewing a new location with (potentially) better conditions for data transmission.

Figure 6:
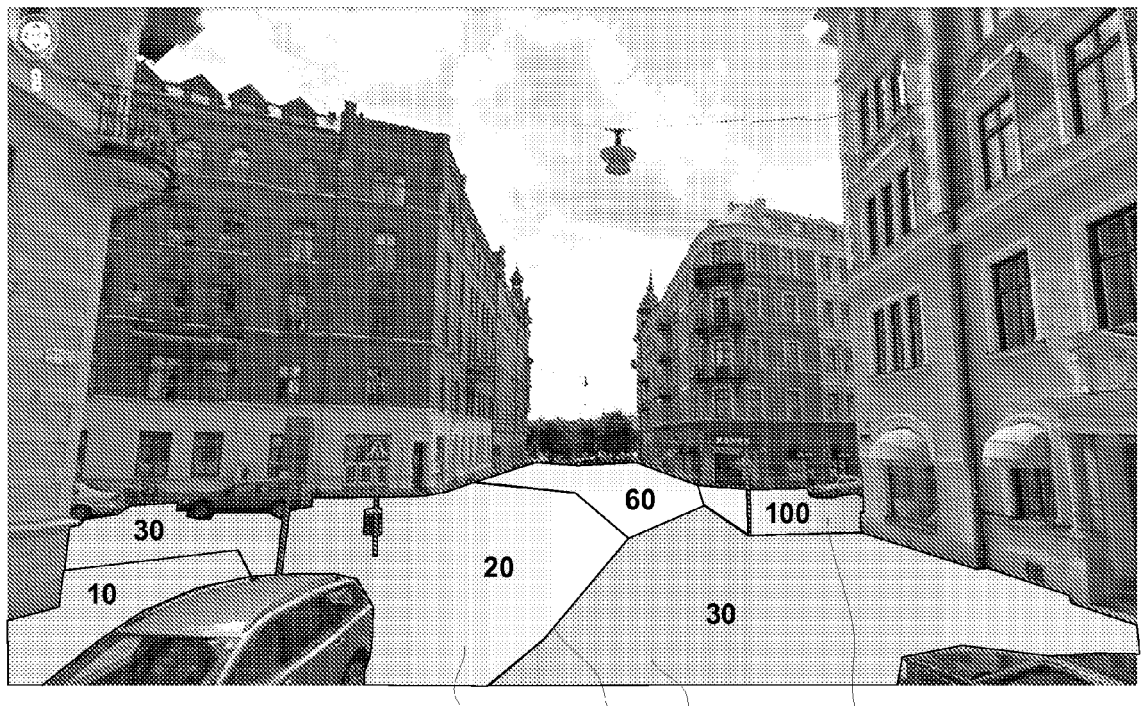
FIG. 6 illustrates how a user equipment may graphically indicate areas with higher quality measures indicative of wireless data transfer rates.

With reference to FIG. 6 an example is shown of how the new location or the direction may be presented on the UE 26. In this example, the UE 26 is configured to download (receive) an image of the current surroundings. The sub-areas with the different quality measures are then mapped on the image such that geographical coordinates of the sub-areas and the map correspond. Alternatively, the sub-areas are already mapped in the image by the network node 12, before received by the UE 26. The sub-areas are separated by lines, such as line 61 that separates sub-area E1 from sub-area E2. The sub-areas can be coded with a measure that indicates a quality of wireless data transfer rates, such as sub-area E1 coded with the number "20" and sub-area E2 coded with the number "30". The number for coding can represent a normalized quality measure such as $QM_{agg}$, where "20" represents a transmission quality that corresponds to 20% of maximum possible transmission.

The image of the current surroundings is retrieved with a view from the current location of the UE 26, and each sub-area mapped on the image can be said to be included in a general area (corresponding to area A of FIG. 1) that includes the current location. Thus, by indicating sub-areas with different and in particular higher quality measures, such as in this example sub-area E3, a direction to a location is given to the user who can simply navigate to the relevant sub-area. For downloading and presenting the image on the UE 26 and mapping the sub-areas on the image, any suitable technique within the field of image processing and mapping of geographical coordinates/boundaries can be used.

Optionally, the image may be taken by the camera 244 in the UE 26 and the sub-areas can then be mapped on the taken image. The very moment the image is taken, the current coordinates of the UE 26 and the direction the UE 26 are stored and used for the mapping.

Figure 7:
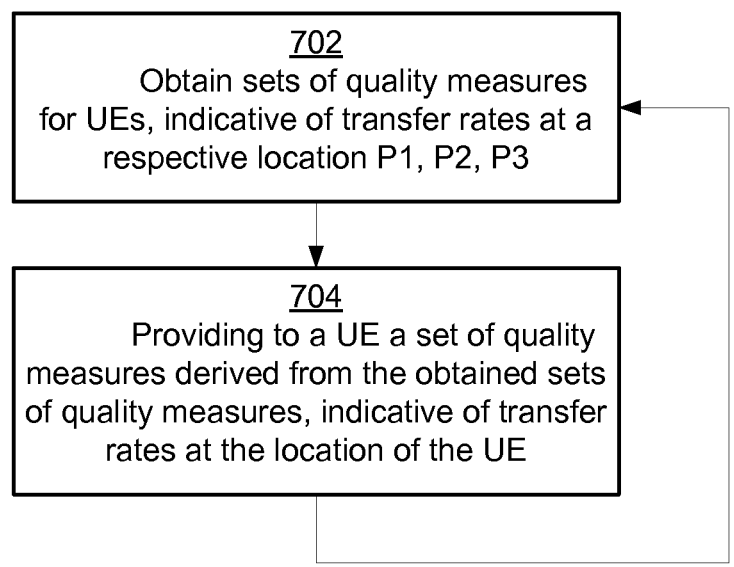
FIG. 7 is a flow chart of a method performed by the network node of FIG. 3.

With reference to FIG. 7 a method performed by the network node 12 is illustrated, and shows a first step 702 of obtaining sets of quality measures from UEs. This process includes participation of many UEs and corresponds to the method of FIG. 4, having in mind that the sets of quality measures are collected for several UEs such that the aforementioned database 314 with quality measures is generated.

In a next step 704 the network node provides to the UE 26 the needed quality measure. In detail, this can be done by employing expression (1), where the UE 26 sends to the network node the coordinates and possibly the current time (if the network node shall not determine the time). Once the location is known a corresponding quality measure can be retrieved from the database 314. If the current location does not correspond to any location stored by the network node 12, a location closest to the current location can be used.

Optionally the parameters app, ser, time, cell, netw are determined for the relevant UE when retrieving the quality measure form the database 314. This gives a more accurate quality measure since expression (2) can be used, i.e. the quality measure is then retrieved as a function of app, ser, time, cell and netw. If no parameter-values corresponding to the current values are available in the database 314, multidimensional linear regression analysis can be used for obtaining a most appropriate quality measure.

Alternatively, when generating the database of quality measures 314, no calculations for cell environment status is performed and/or no network dependent quality measure is determined, such that the quality measure QM or $QM_{norm}$ only depends on coord, and possibly also depends on any of app, ser and time. However, to take radio environment measurements $QM_{cell}$ into account, a current cell environment status can be determined and normalized in real time for the UE in question, as described above for obtaining a value of $QM_{cell,norm}$. The same applies for the network dependent quality measure which also can be normalized, i.e. a current network dependent quality measure $QM_{netw,norm}$ is determined.

An aggregated quality measure $QM_{agg}$ to be provided to the UE can then be made dependant on radio environment and network, e.g. by using the following expression:

$$QM_{agg}=QM_{norm}*QM_{cell,norm}*QM_{netw,norm} \quad (4)$$

where $QM_{norm}$ is retrieved from the database and $QM_{cell,norm}$ and $QM_{netw,norm}$ are retrieved in real time such that they reflect the current cell status and network status.

The quality measure $QM_{agg}$ is in fact dependant on the same parameters as the quality measure explained in connection with expressions (1)-(3), but with the difference that radio environment and network dependencies are determined in real time, which in some situations can render a more accurate result. Thus, the quality measure, regardless of how it is determined, may be associated with any of a certain time, base station, network, application or service. However, it is always associated with a certain location or area.

Additionally, the calculation of quality measures can use standardized quality models such as ITU-T P.NAMS for parametric model, which is an ITU-T recommendation on non-intrusive evaluation model of multimedia quality based on IP protocol information. Another approach includes using a bitstream model or hybrid model that uses the whole media bitstream to calculate a score, where the numbers of lost packets etc. is not transmitted to the model but only the media stream. The model can then make partial decoding or perform other calculations to estimate the perceived quality. An example of a bitstream model is P.NBAMS, which is an ITU-T recommendation for non-intrusive evaluation model of multimedia quality based on IP protocol and bit-stream information.

The repetition rates of the methods can be allowed to vary and the actual rate is a negotiation between providing accurate data and a desire to minimize the load on the network and the storage of data, and is typically dependent on the types of UE, base station and network employed.

The UE and the network node described herein are in addition implemented according to known standards and protocols within the field of wireless communication. Software instructions, i.e. a computer program code for carrying out the previously discussed methods may for development convenience be written in a high-level programming language such as Java, C, and/or C++ but also in other programming languages, such as, but not limited to, interpreted languages. Some modules or routines may be written in assembly language or even micro-code to enhance performance and/or memory usage. It will be further appreciated that the functionality of any or all of the functional steps of the method may also be implemented using discrete hardware components, one or more application specific integrated circuits, or a programmed digital signal processor or microcontroller.

Although various embodiments of the invention have been described and shown, the invention is not restricted thereto, but may also be embodied in other ways within the scope of the subject-matter defined in the following claims. In particular, the invention may be implemented by omitting any of the parameters indicative of a quality measure but for the coordinate coord, i.e. any of app, ser, time, cell, netw may in any combination be omitted. Also, numerous quality indicating algorithms may be used, in particular if normalization is employed.

The invention claimed is:

1. A user equipment for wireless communication with a mobile base station, the user equipment being configured to:
obtain a current location of the user equipment,
receive a set of quality measures indicative of wireless data transfer rates in an area comprising the current location, wherein the set of quality measures comprises an opinion score (OS), and
present on a graphical interface of the user equipment at least one of: (i) a new location located in the area and (ii) a direction to the new location, wherein
the new location is, in comparison with the current location, associated with a relatively higher quality measure indicative of a wireless data transfer rate, and
the set of quality measures is associated with:
an application residing in the user equipment, and
a service provided to the user equipment.

2. The user equipment according to claim 1, wherein the set of quality measures is associated with a certain time.

3. The user equipment according to claim 1, wherein the set of quality measures is associated with a mobile base station the user equipment currently is communicating with.

4. The user equipment according to claim 1, wherein the set of quality measures is associated with performance metrics in a communication network that delivers a service to the user equipment.

5. The user equipment according to claim 1, wherein the area comprises a set of sub-areas.

6. The user equipment according to claim 5, wherein each sub-area is associated with a respective quality measure of the set of quality measures.

7. The user equipment according to claim 5, wherein each sub-area has a respective area of $1\ m^2$-$250\ m^2$.

8. The user equipment according to claim 1, wherein the user equipment is configured to provide a warning message in response to a determination that the user equipment approaches a location associated with a relatively lower quality measure indicative of the wireless data transfer.

9. A network node for a wireless communication network, configured to:
obtain sets of quality measures for a number of wireless user equipments communicating with a mobile base station of the wireless communication network, the sets of quality measures indicative of wireless data transfer rates at a respective current location of the wireless user equipment and in a common area, and wherein the sets of quality measures comprise an opinion score (OS),
provide to a certain user equipment in the common area a set of certain quality measures, the set of certain quality measures derived from the obtained sets of quality measures, and
indicative of wireless data transfer rates at the current location of the certain user equipment, and the set of obtained quality measures is associated with:
an application residing in the wireless user equipments, and
a service provided to the wireless user equipments.

10. The network node according to claim 9, wherein
the set of certain quality measures is associated with previous locations of the number of wireless user equipments for which the sets of quality measures was obtained, and
the previous locations correspond to the current location of the certain user equipment.

11. The network node according to claim 9, configured to measure network performance, and include the measured network performance in the sets of quality measures.

12. The network node according to claim 9, wherein the sets of obtained quality measures are associated with a certain time.

13. The network node according to claim 9, wherein the sets of obtained quality measures are associated with the mobile base station.

14. The network node according to claim 9, wherein the obtained sets of quality measures are associated with performance metrics in a communication network that delivers a service to the user equipments for which the sets of quality measures were obtained.

15. The network node according to claim 9, wherein the area comprises a set of sub-areas.

16. The network node according to claim 15, wherein each sub-area is associated with a respective quality measure of the sets of quality measures.

17. The network node according to claim 15, wherein each sub-area has a respective size of $1\ m^2$-$250\ m^2$.

18. A method performed by a user equipment adapted for wireless communication with a mobile base station, the method comprising:
obtaining a current location of the user equipment,
receiving a set of quality measures indicative of wireless data transfer rates in an area comprising the current location, wherein the set of quality measures comprises an opinion score (OS), and
the set of quality measures is associated with:
an application residing in the user equipment, and
a service provided to the user equipment, and
presenting on a graphical interface of the user equipment at least one of (i) a new location comprised in the area and (ii) a direction to the new location comprised in the area, wherein
the new location is, in comparison with the current location, associated with a relatively higher quality measure indicative of a wireless data transfer rate.

19. A method performed by a network node installed in a wireless communication network, the method comprising:
obtaining sets of quality measures for a number of wireless user equipments communicating with a mobile base station of the wireless communication network, the sets of quality measures indicative of wireless data transfer rates at a respective current location of the wireless user equipment and in a common area, and wherein the sets of quality measures comprise an opinion score (OS),
providing to a certain user equipment in the common area a set of certain quality measures, the set of certain quality measures derived from the obtained sets of quality measures, and indicative of wireless data transfer rates at the current location of the certain user equipment, and
the sets of obtained quality measures is associated with:
applications residing in the user equipments, and
a service provided to the user equipments.

20. A Mon-transitory computer-readable medium storing processing instructions that, when executed by a user equipment, performs the method according to claim 18.

21. A non-transitory computer-readable medium storing processing instructions that, when executed by a network node, performs the method according to claim 19.

22. The method of claim 1, wherein the OS is a numerical indication of a perceived quality from a user's perspective of received media.

23. The method of claim 1, wherein the OS is a Mean Opinion Score (MOS).

24. The network node of claim 9, wherein the OS is a numerical indication of a perceived quality from a user's perspective of received media.

25. The network node of claim 9, wherein the OS is a Mean Opinion Score (MOS).

26. The method of claim 18, wherein the OS is a numerical indication of a perceived quality from a user's perspective of received media.

27. The method of claim 18, wherein the OS is a Mean Opinion Score (MOS).

28. The method of claim 19, wherein the OS is a numerical indication of a perceived quality from a user's perspective of received media.

29. The method of claim 19, wherein the OS is a Mean Opinion Score (MOS).

* * * * *